(12) United States Patent
McBride et al.

(10) Patent No.: US 7,963,437 B1
(45) Date of Patent: Jun. 21, 2011

(54) SYSTEMS AND METHODS FOR DISTRIBUTED PRINTING OF PERSONALIZED POSTAGE INDICIA

(75) Inventors: Kenneth Thomas McBride, Hermosa Beach, CA (US); James Michael Bortnak, Santa Barbara, CA (US); JP Leon, Marina del Rey, CA (US); John Roland Clem, Redondo Beach, CA (US)

(73) Assignee: Stamps.com Inc., Los Angeles, CA (US)

( * ) Notice: Subject to any disclaimer, the term of this patent is extended or adjusted under 35 U.S.C. 154(b) by 514 days.

(21) Appl. No.: 12/103,483

(22) Filed: Apr. 15, 2008

(51) Int. Cl.
*G09F 3/00* (2006.01)
(52) U.S. Cl. .......... 235/101; 235/375; 235/487; 283/71; 283/81
(58) Field of Classification Search .................. 235/101, 235/375, 487; 705/400–408; 283/71, 81
See application file for complete search history.

(56) References Cited

U.S. PATENT DOCUMENTS

| 5,612,541 | A | 3/1997 | Hoffmann et al. | |
|---|---|---|---|---|
| 6,249,777 | B1 | 6/2001 | Kara et al. | |
| 6,853,990 | B1 | 2/2005 | Thiel | |
| 7,149,726 | B1 | 12/2006 | Lingle et al. | |
| 7,784,090 | B2 | 8/2010 | Lord et al. | |
| 2002/0149195 | A1* | 10/2002 | Beasley | 283/71 |
| 2003/0037008 | A1* | 2/2003 | Raju et al. | 705/60 |
| 2004/0128264 | A1* | 7/2004 | Leung et al. | 705/402 |
| 2005/0114276 | A1* | 5/2005 | Hunter et al. | 705/408 |
| 2006/0118631 | A1* | 6/2006 | Lubow et al. | 235/462.01 |
| 2006/0293907 | A1* | 12/2006 | Castineiras | 705/1 |
| 2007/0078795 | A1 | 4/2007 | Chatte | |

OTHER PUBLICATIONS

U.S. Appl. No. 10/862,058, Pagel et al.
U.S. Appl. No. 11/509,309, J. P. Leon.
U.S. Appl. No. 11/729,148, Leon et al.
U.S. Appl. No. 12/030,739, McBride et al.

* cited by examiner

*Primary Examiner* — Thien M. Le
*Assistant Examiner* — Christle I Marshall
(74) *Attorney, Agent, or Firm* — Fulbright & Jaworski, L.L.P.

(57) ABSTRACT

Systems and methods which provide for distributed printing of personalized postage indicia are shown. Embodiments facilitate printing of personalized postage indicia at various distributed printing locations, such as user sites, retail locations, consumer kiosks, etc., while implementing techniques to avoid widespread availability of live (e.g., active or representing postage value) postage barcodes, prevent printing of fraudulent postage indicia, and/or preventing approved images from being replaced with unapproved images in printed postage indicia. Embodiments facilitate distributed printing of personalized postage indicia through implementation of a technique wherein a manufacturer, such as a postage service provider or a postal authority, provides a centralized print of unassigned tokens on postage stock. The unassigned tokens are configured or otherwise able to form a complete postage indicia when appropriate personalized content is associated therewith.

24 Claims, 5 Drawing Sheets

SYSTEMS AND METHODS FOR DISTRIBUTED PRINTING OF PERSONALIZED POSTAGE INDICIA

CROSS-REFERENCE TO RELATED APPLICATIONS

The present application is related to co-pending and commonly assigned U.S. patent application Ser. No. 10/862,058 entitled "Virtual. Security Device," filed Jun. 4, 2004, Ser. No. 10/991,241 entitled "System and Method for Generating Personalized Postage Indicia," filed Nov. 17, 2004, Ser. No. 11/713,533 entitled "System and Method for Printing Multiple Postage Indicia," filed Mar. 2, 2007, Ser. No. 11/509,309 entitled "Invisible Fluorescent Ink Mark," filed Aug. 24, 2006, Ser. No. 11/729,148 entitled "Computer-Based Value-Bearing Item Customization Security," filed Mar. 27, 2007, Ser. No. 12/030,739 entitled "Systems and Methods for the Distributed Activation of Postage," filed Feb. 13, 2008, and Ser. No. 12/103,496, entitled "Systems and Methods for Activation of Postage Indicia at Point of Sale," filed concurrently herewith, the disclosures of which are hereby incorporated herein by reference.

TECHNICAL FIELD

The present invention relates to postage indicia and, more particularly, to providing distributed printing of personalized postage indicia.

BACKGROUND OF THE INVENTION

Personalized postage indicia created to include photographs or graphic images generated by users have been commercially available for several years. Specifically, the PHOTOSTAMPS® product available from Stamps.com Inc., Los Angeles, Calif. (the assignee of the present application), allows users to select personal photographs, graphic images, and other personalized pictures (collectively referred to herein as images) for inclusion in postage indicia. Integration of such images into postage indicia provides for a postage indicia which appears more like a traditional postage stamp than the postage meter stamps previously available to users. Moreover, the ability to personalize postage indicia through integration of such images has added a new facet to posting mail items. Accordingly, the PHOTOSTAMPS® product has meet with commercial success.

However, certain realities of the ability to personalize postage indicia with images has heretofore necessitated implementing a centralized postage indicia printing model. Specifically, to prevent lewd, crude, or otherwise inappropriate images being incorporated into postage indicia, the commercialized model for printing such postage indicia has been to have users submit their images to a central facility (e.g., a postage service provider facility, such as a PC postage vendor) for review and approval. The images may be reviewed by personnel for inappropriate messages, symbols, nudity, etc. Once reviewed and approved, postage indicia including the approved indicia may be generated and printed in the postage amounts and numbers of postage indicia requested by the user. For example, information based indicia (IBI), such as may comprise barcode postage security information and thus is utilized to represent postage value, may be integrated with approved images in order to generate a personalized postage indicia. For example, generated personalized postage indicia may be provided as a digital image file (e.g. PDF, JPG, GIF, or other file format) containing IBI, an approved image, and additional information (e.g., human readable postage amount, text message, postal class, etc.). Printing of such postage indicia has been carefully controlled within the central facility because the generated file contains postage indicia, to prevent theft or fraudulent printing of postage indicia (e.g., multiple prints), in order to avoid a user or other individual from replacing approved images with unapproved images prior to printing, etc.

BRIEF SUMMARY OF THE INVENTION

The present invention is directed to systems and methods which provide for distributed printing of personalized postage indicia. For example, embodiments of the present invention facilitate printing of personalized postage indicia at various distributed printing locations, such as user sites, retail locations, consumer kiosks, etc., while implementing techniques to avoid widespread availability of live (e.g., active or representing postage value) postage barcodes, prevent printing of fraudulent postage indicia, and/or preventing approved images from being replaced with unapproved images in printed postage indicia. Personalized postage indicia according to embodiments of the invention provide postage indicia acceptable by a postal authority for proof of payment for postal service wherein the postage indicia includes one or more ornamental aspects, such as may comprise photos, pictures, images, symbols, messages, etc. (collectively referred to as personalized content), customized or personalized by a user (e.g., postal customer).

Embodiments of the present invention facilitate distributed printing of personalized postage indicia through implementation of a technique wherein a manufacturer, such as a postage service provider (e.g., a PC postage vendor, an Internet postage vendor) or a postal authority (e.g., the United States Postal Service (USPS) or other postal service, etc.), provides a centralized print of unassigned (e.g., not yet activated or not yet representing postage value) tokens (e.g., IBI barcodes) on postage stock adapted to later receive personalized content printed thereon. Unassigned tokens as may be printed on postage stock according to embodiments of the invention may comprise complete or partial tokens. For example, where unassigned tokens are provided in the form of IBI barcodes, a partial IBI barcode may be printed within each portion of the postage stock which is to later form a personalized, postage indicium. Such incomplete unassigned tokens are preferably completed at a later time, adding further security with respect to preventing fraudulent or unauthorized use of tokens used in creating valid postage indicia. However, even where the unassigned token printed on the postage stock is a complete token, its being unassigned provides security with respect to preventing fraudulent or unauthorized use of the token.

The foregoing unassigned tokens of embodiments are configured or otherwise able to form a complete postage indicia when appropriate personalized content is associated therewith. Where the unassigned tokens comprise partial tokens, the foregoing personalized content may, for example, be adapted to complete the partial unassigned tokens provided on the postage stock upon which the personalized content is printed. Accordingly, the postage stock, having unassigned token printed thereon, may be distributed to various distributed printing locations for use in creating personalized postage indicia according to embodiments of the invention with little or no risk that the tokens thereon can be stolen or fraudulently used. For example, postage stock of embodiments of the present invention may be purchased at various retail locations using a substantially traditional payment model (e.g., payment by a purchaser to a retail merchant by cash, check, credit card, debit card, etc.).

The foregoing postage stock preferably includes some form of unique or substantially unique (collectively referred to herein as unique) identification information (e.g., substantially unique identification information may be repeated at intervals sufficient to avoid confusion as to identification of particular postage stock), such as a serial number, digital signature, cryptographic code, etc. According to a preferred embodiment, the foregoing postage stock includes the identification information in a machine readable format, such as barcode, magnetic ink character recognition (MICR) code, radio frequency identification (RFID) tag, holographic code, etc., so as to facilitate automated scanning of the information, such as at a point of sale (POS), at a distributed printing location, etc. Additionally or alternatively, one or more of the unassigned tokens may be used to provide identification of postage stock, such as where an ability to read or otherwise identify unassigned token(s) printed on the postage stock is available (e.g. where POS terminal equipment is compatible with IBI barcode technology).

According to embodiments, once personalized content is approved for use in personalized postage indicia, a digital file including an appropriate number of approved images, formatted and arranged for printing on the postage stock, is provided to a distributed printing location for completion of personalized postage indicia. That is, a file containing approved personalized content (e.g., approved image(s)), without the foregoing token(s) of a complete postage indicia (e.g., IBI barcode(s)), is provided to the distributed printing location according to embodiments of the invention. Such a file is preferably utilized at the distributed printing location in printing the personalized content onto postage stock, available at the distributed printing location, having the aforementioned unassigned tokens thereon. Accordingly, transfer of live or otherwise complete postage indicia within the aforementioned digital file is avoided. Moreover, the postage stock utilized in providing completed personalized postage indicia according to embodiments of the invention has no value until the tokens thereon are activated.

Personalized content and/or files transferring approved personalized content utilized according to the present invention to provide complete personalized postage indicia may include content in addition to user supplied personalized content. For example, where partial unassigned tokens are present on the postage stock, the aforementioned file containing approved personalized content may additionally contain corresponding partial tokens for completing the unassigned tokens when the personalized content is printed, thereby providing complete personalized postage indicia. Of course, such additional content, such as the aforementioned partial tokens used to complete the partial unassigned tokens, may be provided separate from personalized content, such as in a separate file, if desired. However, embodiments of the invention include such additional content within the approved personalized content, such as for security and prevention of misuse. For example, approved personalized content or the file transferring approved personalized content may be adapted to include identification or control information (e.g., serial number, transaction identification number, watermark, digital signature, cryptographic string, etc.) used to confirm that only approved personalized content is printed on the postage stock for creating personalized postage indicia.

The unassigned tokens on postage stock utilized in providing personalized postage indicia are preferably assigned when or after a complete personalized postage indicia is formed from the unassigned token and the personalized content to thereby become live postage. For example, equipment of a POS system, such as at a retail location or kiosk providing one of the aforementioned distributed printing locations may scan the postage stock unique identification (e.g., using a barcode scanner, a MICR reader, an RFID scanner, optical character recognition (OCR) system, etc.) to identify the particular postage stock, and thus the unassigned token, for assigning those tokens as live postage. The identification information, preferably accompanied by additional information (e.g., desired number of postage indicia, postage indicia amount, identification of image(s) included as personalized postage indicia, postage class, account for payment of postage value, etc.) may be provided to an entity for assigning or activating the tokens as live postage and/or other processing. For example, the foregoing information may be provided to a postage service provider (e.g., the postage service provider which initially produced the unassigned tokens for activation of the tokens).

In operation according to embodiments of the invention, the identification information is used to assign or activate unassigned tokens, and thus the personalized postage indicia generated therewith, to provide live postage indicia acceptable to a postal authority. For example, copies of the unassigned tokens, information included within the unassigned tokens, information identifying the unassigned tokens, etc. may be moved from an unassigned token database to an assigned token database to thereby activate the tokens, and thus the personalized postage indicia created therewith, as live postage. Other information may additionally or alternatively be stored in association with activated tokens, such as personalized content, user information (e.g., user identification, payment information, etc.), point of sale or activation information (e.g., retailer identification, activation location, etc.), and/or the like.

Activation of the personalized postage indicia typically includes payment to a postal authority (e.g., the USPS) for the appropriate postage value, such as through decrementing a descending register of a postage security device, debiting a prepaid account, incrementing a postpaid account, and/or the like. The foregoing payment for postage value may be provided directly from a user, indirectly from a user through an activation service provider (e.g., retailer), indirectly from a user through a postage service provider (e.g., Internet postage provider), directly from an activation service provider, indirectly from an activation service provider through a postage service provider, etc.

Where approved personalized content or the file transferring approved personalized content include identification or control information, such as the aforementioned serial numbers, transaction identification numbers, watermarks, digital signatures, cryptographic strings, etc., scanning of the postage stock at the distributed printing locations for activation of the personalized postage indicia may further comprise scanning of personalized content control information. Such information may be utilized to confirm that approved personalized content has been printed on the postage stock, that the approved personalized content is printed in combination with the correct unassigned tokens, that the approved personalized content has not been printed more than an allowed number of times, etc. Where personalized content control information is not present or is otherwise improper, assignment of the tokens on the postage stock as live postage indicia tokens is preferably prevented.

After the foregoing printing and activation of the personalized postage indicia, individual personalized postage indicium may be utilized to post mail items. The token present on any or each such personalized postage indicium, and/or perhaps the personalized content control information if present, may be utilized at one or more points in a mail processing stream to validate the postage indicium, to detect fraud or misuse of tokens, etc.

It should be appreciated that a distributed printing model of complete postage indicia would increase the risk of fraud or misuse of the postage indicia, such as through theft of a digital file which includes complete, live postage indicia being transferred for printing because the file is no longer contained within a single (or a few) physical secure printing location(s). For example, a rogue retail employee could take home stock and a digital file and modify the image thereby creating inappropriate customized postage stamps with real (albeit stolen) barcodes. Facilitating distributed printing of a customized postage item at retail locations has heretofore been considered only with respect to implementing a high security application to control the digital image file and to control the printing of the file (e.g. allow one time print only, never allow the end user to view the file on screen, do not allow a print-to-file type driver, etc.). Such high security applications require that the file be controlled using a client-server type security system, and that the application that controls the printing of the file at the retail location must be a local application (e.g., a WINDOWS, ACTIVE-X, or JAVA client application) instead of a pure web application (e.g. without any local client component). However, retailers typically do not want to distribute, install, update, and maintain a local client application at every retail location.

When only a single or limited print model is used for the digital image file with live barcoded postage, misprints are cumbersome because typically the misprinted postage physical proof needs to be saved and returned to the postal authority (or saved for an audit process) so that it can be presented for credit. Retailers, however, are not set up to effectively deal with returning misprinted physical proofs to the manufacture or to the postal authority.

Embodiments of the invention, as described above, avoid these and other problems to facilitate implementations which may readily be deployed at distributed printing locations, such as retail locations. For example, because neither the postage stock nor the personalized content files contain complete or live postage indicia, the loss or theft of either does not result in the loss or theft of postage indicia. Moreover, because the unassigned tokens of the postage stock of embodiments are only activated at a point of sale or other location when the personalized postage has been completed and purchased by a postal customer, the risk of loss, theft, or misuse is minimized. Because unassigned tokens have no value, misprints of approved personalized content in an attempt to provide complete personalized postage indicia is a minor inconvenience. That is, the misprinted postage stock may simply be discarded, never having been activated, and the printing attempt may be repeated with another piece of postage stock. Once the printed personalized postage indicia is satisfactory to the user, the tokens may be activated, and thus an appropriate amount of postage paid.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
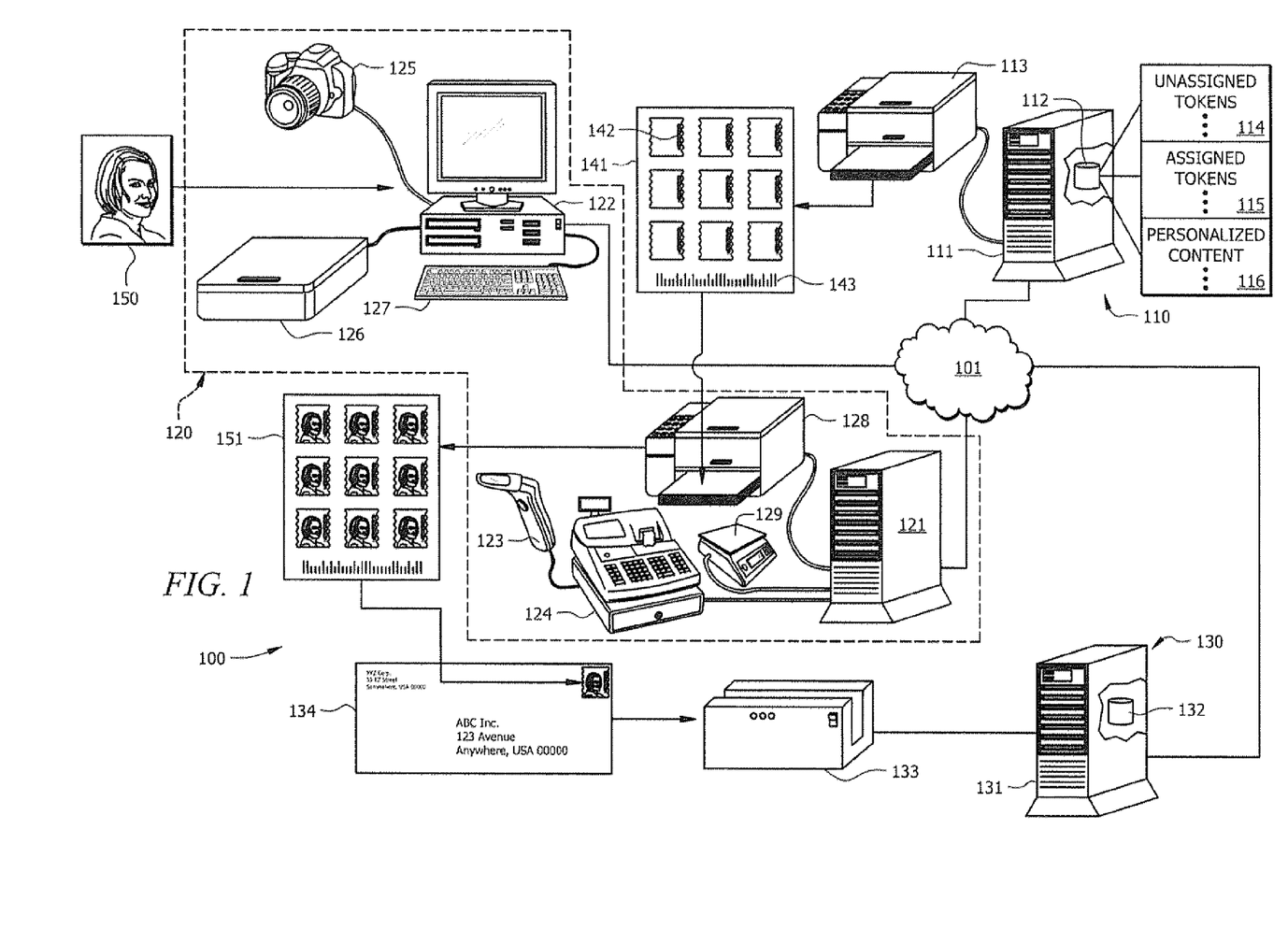
FIG. 1 shows a system adapted to provide distributed printing of personalized postage indicia according to an embodiment of the present invention.

Directing attention to FIG. 1, a system adapted to provide distributed printing of personalized postage indicia according to an embodiment of the invention is shown as system 100. System 100 of the illustrated embodiment comprises activation system 110, distributed printing system 120, and validation system 130, in communication through network 101, cooperating to provide distributed printing of personalized postage indicia.

Network 101 of the illustrated provides information communication between activation system 110, distributed printing system 120, and validation system 130. The foregoing systems may be disposed locally or remotely with respect to one another. For example, activation system 110 and validation system 130 may be disposed locally with respect to each other (e.g., at a postage service provider, at a postal system facility, etc.), whereas distributed printing system 120 may be disposed remotely with respect to activation system 110 and validation system 130 (e.g., at a retail location or private business). Of course, activation system 110 and validation system 130 may be disposed remotely with respect to each other, if desired. Accordingly, network 101 of embodiments may comprise the Internet, an intranet, an extranet, a local area network (LAN), a metropolitan area network (MAN), a wide area network (WAN), the public switched telephone network (PSTN), a wireless network, a cable transmission system, a satellite communication network, and/or the like.

Activation system 110 preferably comprises a processor-based system, such as a computer having a central processing unit (CPU), memory (shown as including database 112), and appropriate input/output (I/O) devices and interfaces, operable under control of an instruction set defining operation as described herein. For example, activation system 110 may comprise server platform 111 having a processor from the PENTIUM family of processors available from Intel Corporation, Santa Clara, Calif. Activation system 110 of the illustrated embodiment provides generation, printing, and activation of tokens for use in generation and printing of personalized postage indicia as described below. Accordingly, activation system 110 of the illustrated embodiment includes database 112 for storage of token identification and status (e.g., as may be provided in unassigned token database 114 and assigned token database 115) and printer 113 for printing tokens on postage stock, such as may comprise envelopes, labels, sheets of paper, etc. Additionally, activation system 110 of the illustrated embodiment provides approval of personalized content for use in forming personalized postage indicia. Accordingly, database 112 of the illustrated embodiment includes personalized content database 116 as may be used as described below.

Although shown as a single system for simplicity, activation system 110 of embodiments may be implemented as a plurality of platforms. For example, separate platforms may be used to generate and print unassigned tokens, to approve personalized content, and/or to activate tokens. Printing of tokens separately from activating the personalized postage indicia as postage indicia may be particularly useful in scenarios where envelope manufacturers or other stock manufacturers include tokens for personalized postage indicia on various forms of envelopes and/or other stationary items at the time of manufacture.

Distributed printing system 120 preferably comprises a processor-based system, such as computers having a CPU, memory, and appropriate I/O devices and interfaces, operable under control of instruction sets defining operation as described herein. For example, distributed printing system 120 may comprise computer platforms 121 and 122 having processors from the PENTIUM family of processors available from Intel Corporation, Santa Clara, Calif.

Distributed printing system 120 preferably provides communication of personalized content 150, such as may be input using various devices (e.g., any of camera 125, scanner 126, and keyboard 127), to activation system 110 for approval as content to form personalized postage indicia. Additionally, distributed printing system 120 of the illustrated embodiment provides communication of postage stock and/or token identification information to activation system 110 for activation of tokens for use as personalized postage indicia according to the concepts of the present invention. Accordingly, the illustrated embodiment of distributed printing system 120 includes scanner device 123 for scanning postage stock identification information, unassigned tokens, and/or personalized content control information, as will be discussed in further detail below. Other forms of input regarding the forgoing information, or other information, may be utilized according to embodiments of the invention, such as a keyboard of point of sale (PUS) terminal 124. For example, scale 129 is provided for input of postal item weight, such as for use in rating postage in order to determine an appropriate or desired amount of postage value for personalized postage indicia.

Although illustrated as being coupled to a particular one of computer platforms 121 and 122 in FIG. 1, it should be appreciated that various ones of the devices may be coupled to a different computer platform and/or additional such devices may be provided coupled to each computer platform, where desired. For example, rather than scale 129 being coupled to computer platform 121 for use in determining an appropriate or desired amount of postage value for personalized postage indicia at a time of purchase, scale 129 may be coupled to computer platform 121 for use in determining an appropriate or desired amount of postage value for personalized postage indicia at a time of submission of personalized content. Additionally, as mentioned above, a scale (or other device) may be coupled to each of computer platforms 121 and 122.

Although shown as separate components in the illustrated embodiment, it should be appreciated that distributed printing system 120 may comprise different configurations than that shown. For example, scanner device 123 and/or scale 129 may be integrated into POS terminal 124, such as in the case of a grocery store POS terminal. Additionally or alternatively, user terminal 122 used in introducing personalized content into system 100 may be integrated into POS terminal 124. User terminal 122 of embodiments, however, may be disposed remotely with respect to other portions of distributed printing system 120. For example, a user's home or business computer, such as may be provided communications via the Internet or other suitable network, may be utilized as user terminal 122 of embodiments of the invention.

Validation system 130 preferably comprises a processor-based system, such as a computer having a CPU, memory (shown as including database 132), and appropriate input/output (I/O) devices and interfaces, operable under control of an instruction set defining operation as described herein. For example, validation system 130 may comprise server platform 131 having a processor from the PENTIUM family of processors available from Intel Corporation, Santa Clara, Calif. Validation system 130 of the illustrated embodiment provides scanning and validation of postage indicia borne on mail pieces as described below. Accordingly, validation system 130 of the illustrated embodiment includes database 132 for storage of validation information (e.g., personalized postage indicia identification and status) and mail piece scanner 133 for scanning and processing mail pieces.

It should be appreciated that configurations of validation system 130 other than that illustrated may be utilized according to embodiments of the invention. For example, mail piece scanner 133 may be coupled to activation system 110, such as through network 101, for performing validation as described herein without server platform 131, if desired.

Use of a validation system, such as validation system 130, is optional according to embodiments of the invention. However, to provide increased confidence as to the validity of personalized postage indicia, and other information based indicia, embodiments of the invention implement a validation system. In order to reduce the volume of processing associated with such a validation system, embodiments of the invention may operate to validate a random or statistical sampling of indicia, rather than each indicia introduced into the mail stream.

Figure 2:
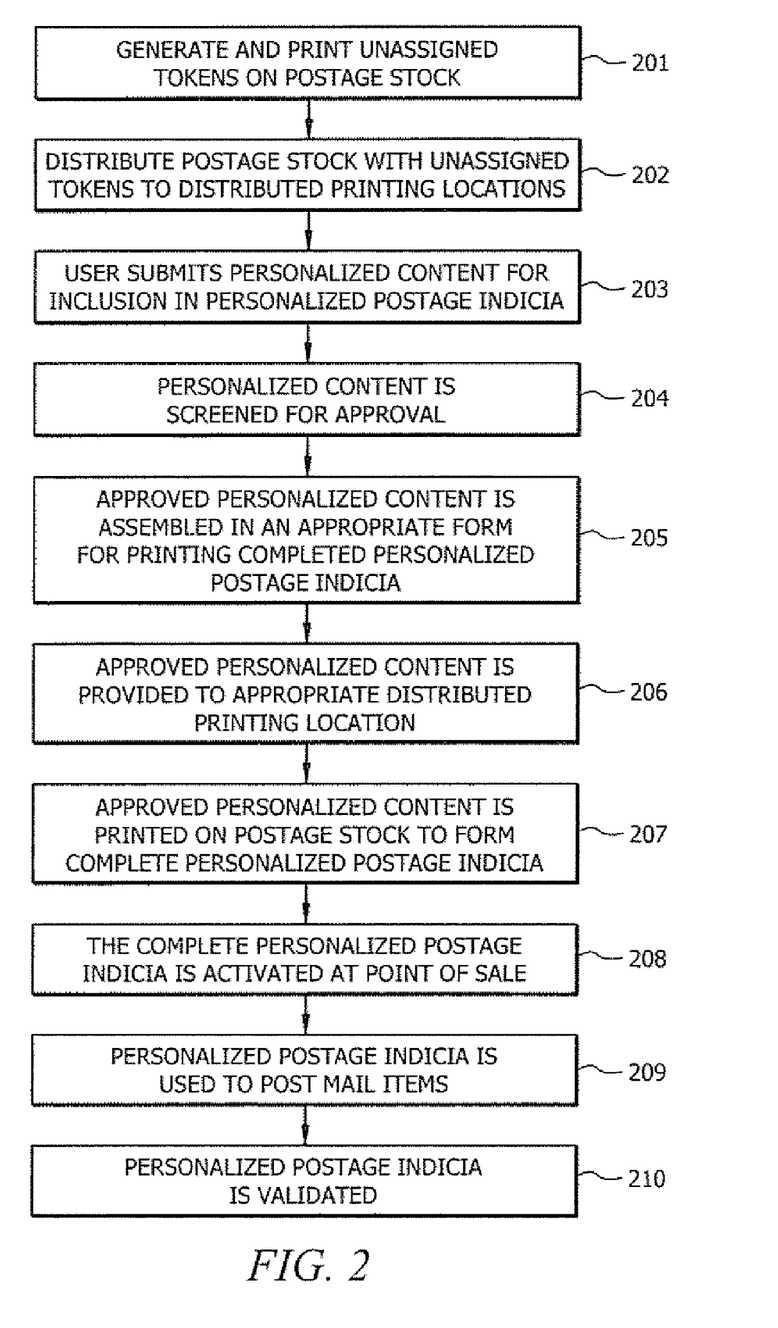
FIG. 2 shows a flow diagram of operation to provide distributed printing of personalized postage indicia according to an embodiment of the present invention.

Operation of system 100 to print personalized postage indicia at distributed locations according to an embodiment of the present invention is represented in the flow diagram of FIG. 2. According to the illustrated embodiment, a manufacturer (e.g., a postage service provider such as Stamps.com, Inc.) generates unassigned or generic tokens that may be used in postage indicia at block 201. The tokens are printed on postage stock for later use in generation of complete personalized postage indicia. For example, activation system 110 generates a plurality of tokens and controls printer 113 to print tokens upon various postage stock, such as envelopes, labels, sheets of paper, etc. Each such token is preferably unique or substantially unique so as to facilitate accurate validation, accounting, and/or auditing with respect to the activation and use thereof.

Printer 113 of the illustrated embodiment is shown printing machine readable tokens 142 on postage stock 141. Although label stock having a plurality of personalized postage indicia transfer areas thereon is illustrated as postage stock 141, embodiments of the invention may utilize different forms of stock. For example, envelope stock, plain paper stock, letterhead stock, label stock, large envelope (flat) stock, and combinations thereof may be utilized according to embodiments of the invention.

Figure 3A:
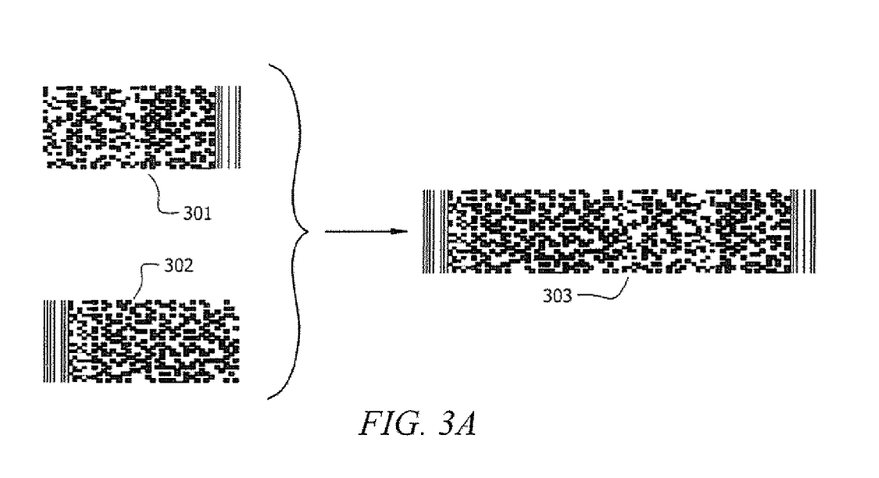
FIGS. 3A and 3B show various embodiments of partial tokens as may be completed according to embodiments of the invention.
Figure 3B:
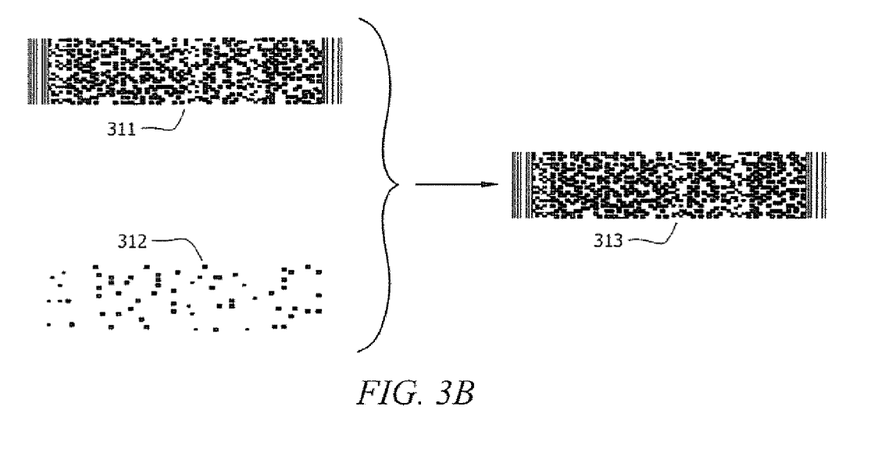

Embodiments of the invention may operate to print a complete token or a partial token on postage stock 141. For example, to provide added security with respect to misuse of the tokens, embodiments may operate to print a fractional token (e.g., partial token 301 of FIG. 3A) which is missing a portion thereof, such as a right, left, top, or bottom portion thereof (e.g., completion partial token 302). Such an embodiment may provide a token which is visibly incomplete, thereby rending the token obviously unacceptable for use as postage indicia in its present state. Embodiments may additionally or alternatively operate to print apparently complete tokens (e.g., partial token 311), but which are missing one or more pieces of information, such as missing various "dots" of a two dimensional barcode (e.g., completion partial token 312), thereby rendering the token unacceptable for use as postage indicia, although perhaps not visibly so. The missing portions of such tokens are preferably stored, such as within database 112 (e.g., within unassigned tokens database 114) for later adding to the tokens. For example, when such a partial token is assigned or activated, the missing portion of the token may be provided for completing the token. The foregoing partial tokens may be completed by printing the completion partial token (e.g., completion partial tokens 302 and 312) at a later time, such as when approved personalized content is printed, to thereby provide complete tokens (e.g., complete tokens 303 and 313).

Machine readable tokens 142 may comprise a bar code such as a PDF417 two dimensional barcode, a data matrix two dimensional barcode, a code 128 one dimensional barcode, a POSTNET (bar and half bar encoding) one dimensional barcode, and/or the like. Additional or alternative forms of machine readable symbology which may be utilized according to embodiments of the invention include universal product code (UPC), code 93, dotcode, magnetic ink character recognition (MICR), etc. Tokens may additionally or alternatively be provided in other forms, such as human readable characters (e.g., letters, numerals, and/or symbols), graphic images, and/or the like. Machine readable embodiments of tokens 142 are provided in a form consistent with the information based indicia (IBI) acceptable to postal authorities, such as the United States Postal Service. Tokens 142 need not include all the information of a full IBI, such as where tokens 142 comprise a "light" IBI implementation as shown in the above referenced patent application entitled "Computer-Based Value-Bearing item Customization Security."

A robust barcode such as the aforementioned PDF417 and data matrix barcodes are preferred according to embodiments of the invention in order to encode a relatively large amount of information therein, to provide data redundancy for error correction, to provide data security, etc. A one dimensional barcode such as the aforementioned POSTNET and code 128 barcodes are preferred according to some embodiments of the invention in order to provide encoded data in a form which is readily scanned using relatively inexpensive and/or which is widely available. Of course, multiple machine readable portions may be included as part of a machine readable token, such as to include a robust two dimensional barcode and a widely readable one dimensional barcode, to accommodate a large variety of use scenarios if desired.

Tokens 142 may be printed using media which is visible in natural light, which is invisible in natural light, or a combination thereof (e.g., partially visible in natural light and partially invisible in natural light) according to embodiments of the invention. For example, tokens 142 provided according to embodiments of the invention may be printed using traditional inks, toners, thermally activated components, etc. to provide an indicia which is visible in natural light. Additionally or alternatively, tokens 142 of embodiments of the invention may be printed using an ink which is invisible in natural light. Printed matter using such ink may be viewed using light of an appropriate wavelength, such as light in the ultraviolet spectrum. Additional detail with respect to indicia which is invisible in natural light is provided in the above referenced patent application entitled "Invisible Fluorescent Ink Mark."

Visibility of indicia which is initially invisible may be transient (e.g., visible only when light of the appropriate wavelength is present) or more permanent (e.g., chemically or molecularly changing to remain visible after light of the appropriate wavelength to "develop" the image is removed). Detail with respect to the use of bi-stable indicia as may be used as the tokens herein is provided in the above referenced patent application entitled "Systems and Methods for the Distributed Activation of Postage." The use of such bi-stable tokens, rendered visible at activation, may provide additional security and fraud prevention with respect to personalized postage indicia of the present invention.

Postage stock 141 preferably includes a code or other identifying information useful in uniquely identifying the postage stock and/or the tokens printed thereon. For example, code 143 included on postage stock 141 may include a serial or sequence number, identification information, digital signature, cryptographic key, and/or the like useful in uniquely identifying postage stock 141 and/or tokens 142 printed thereon. Activation system 110 preferably records such identification information in database 112, such as part of the data of unassigned tokens database 114, for use in activating the personalized postage indicia.

Additionally or alternatively, tokens 142 may include a code or other identifying information useful in uniquely identifying the tokens. For example, codes included in the tokens may include serial or sequence numbers, identification information, digital signatures, cryptographic keys, and/or the like useful in uniquely identifying the tokens and/or the personalized postage indicia created therewith. Activation system 110 preferably records such identification information in database 112, such as part of the data of unassigned tokens database 114, for use in activating and/or verifying the personalized postage indicia.

According to embodiments of the invention information, such as the activation status of tokens, is stored in database 112, such as part of the data of unassigned tokens database 114. For example, when tokens 142 are generated, activation system 110 may store a unique code identifying each generated token in database 112 along with a status identifier indicating the tokens are "unactivated" or "unassigned". As discussed below, the status identifier may be updated upon activation of the tokens when personalized postage indicia has been created and activated to indicate the indicia are "activated". Such status identifiers may be useful with respect to validation of the indicia, as discussed further below. Additional or alternative information which may be stored in association with tokens may include identification of an entity or account for which the tokens were generated (e.g., a business requesting the tokens for their inventory or their use in mailing postal items), an entity generating the tokens (e.g., a service provider generating the tokens), identification of a system used to generate the tokens, cryptographic keys used for encrypting/decrypting information in the tokens, digital signatures used to authenticate the tokens, information regarding geographic areas mail items bearing indicia using the tokens may be introduced into a mail processing stream and/or geographic areas mail bearing indicia using the tokens may be delivered to, particular services and/or levels of service indicia bearing the indicia may be used for, and/or the like. Such additional information may be used in an audit trail with respect to any particular token or indicium created therewith, used to detect fraud or abuse of tokens and indicia created therewith, used for accounting purposes, used to restrict or manage the use of tokens or indicia created therewith, etc.

Although embodiments are described above with respect to providing information to identify an entity or account for which tokens and/or indicia created therefrom were generated, tokens and indicia provided according to embodiments of the invention, both before activation and thereafter, may be anonymous (e.g., a user of the indicia is not identified by the indicia, as with a traditional postage stamp). Likewise, although embodiments are described above with respect to providing tokens and indicia which are geographically restricted (e.g., having a limitation with respect to a source and/or destination address associated with the use of the postage indicia), it should be appreciated that tokens and indicia provided according to embodiments of the invention may be geographically ambivalent (e.g., having no limitation with respect to a source or destination address associated with use of the postage indicia).

Tokens of embodiments of the invention may be printed alone or in combination with various images, information, characters, symbols, and/or marks (collectively referred to as marks). For example, tokens may be printed alone, with one or more marks used to facilitate processing of indicia (e.g., a facing identification mark (FIM)), with human readable information, with one or more indicator marks, and/or the like. Such marks may be used in preparing mail items, processing mail items, for aesthetic or other purposes, etc.

Moreover, the tokens used according to embodiments may be provided in forms other than pre-printed embodiments. For example, tokens utilized according to embodiments of the invention may comprise radio frequency identification (RFID) tags embedded in or affixed to postage stock 141, if desired.

At block 202 of FIG. 2, postage stock 141 of the illustrated embodiment, having tokens 142 thereon, is provided to a number of distributed printing locations for use in creating personalized postage indicia. For example, postage stock 141 may be provided to a retail merchant, a kiosk service provider, a business operator, etc. associated with distributed printing system 120, preferably as part of a plurality of postage stock, for later use in creating personalized postage usable in posting mail items. Such an operator may offer personalized postage indicia printing services to the public or may provide personalized postage indicia printing for their own use.

A user, such as a retail customer, submits or selects personalized content (e.g., personalized content 150) for inclusion in personalized postage indicia at block 203. For example, the user may access user terminal 122, such as may comprise the user's personal or business computer, a self service kiosk, a terminal disposed in a retail location, etc., to provide personalized content that the user desires to be included in personalized postage indicia. Accordingly, a user may submit or select personalized content remotely with respect to a selected distributed printing location, such as via a computer and Internet or other connection, or locally with respect to a selected distributed printing location, such as via an "in-store" terminal. The user may create the personalized content, such as through taking a photograph (e.g., using camera 125), manipulating a drawing device, inputting information (e.g., using keyboard 127), etc. Additionally or alternatively, the user may select particular content, such as through scanning an existing image using scanner 126, selecting an image from a database, etc. The user may utilize user terminal 122 to further personalize the content, such as through image editing, addition of text, etc. Likewise, the user may utilize user terminal 122 to adapt the personalized content for use in personalized postage indicia, such as to crop a photograph to properly fit an image portion of postage stock 141, include delivery instructions, include a class of mail, etc.

It should be appreciated that a user submitting personalized content for inclusion in personalized postage indicia need not be a same user activating complete personalized postage indicia for use as valid postage indicia, as described below. For example, a first user may provide a service which submits personalized content for inclusion in personalized postage, such as a part of a wedding photography or other service, whereby a second user may obtain completed personalized postage at a convenient distributed postage printing location and activate the completed personalized postage indicia at a point of sale.

The user may provide information in addition to the aforementioned personalized content according to embodiments of the invention. Some or all of the additional information may be provided to activation system 110, distributed printing system 120, and/or validation system 130. The user may, for example, select amounts of postage for the desired personalized postage indicia, a class of mail, a size or other attribute of the personalized postage indicia, a number of personalized postage indicia desired, a particular distributed postage printing location for printing the personalized postage indicia, an account for payment of personalized postage services and/or postage value, etc. Scale 129 may be utilized by a user to obtain a weight of one or more mail items for determining an amount of postage for the desired personalized postage indicia. Distributed printing system 120 may comprise rating tables, or may interface with another system such as activation system 110 or validation system 130 having rating tables, for determining an amount of postage.

Additionally or alternatively, a user may provide information such as an electronic mail address, a short message service address, and/or a telephone number in order to facilitate notification of approval of submitted personalized content, updating of the status of personalized content approval or personalized postage indicia generation, interaction to modification, revision, and/or resubmission of personalized content, etc. The foregoing contact information may be with respect to the user submitting the personalized content, a user expected to obtain (e.g., purchase) the resulting personalized postage indicia, and/or any other entity for which communication is desired.

At block 204, the personalized content is screened for approval to include in personalized postage of the present invention. For example, distributed printing system 120 may provide the personalized content to activation system 110 for screening and approval. Such screening and approval may be accomplished by automated means and/or manual means. For example, algorithms operable upon activation system 110 may automatically scan personalized content for forbidden words, messages, symbols, etc. Additionally or alternatively, algorithms operable upon activation system 110 may use fuzzy logic to analyze images for improper content, such as to recognize the presence of excessive amounts of skin tones indicating nudity, to recognize common gestures, etc. Personnel, such as postage service provider personnel, may additionally or alternatively review the personalized content, such as to provide an additional layer of screening for the aforementioned automated scanning.

According to embodiments of the invention, a user submitting personalized content for inclusion in personalized postage indicia is provided a projected or predicted time for approval of the personalized content. For example, operation at blocks 203 and 204 may cooperate to analyze a content screening queue to provide a time period a submitting user might expect the personalized content to have passed through the screening process, and thus an estimated time by which the personalized content should be ready for printing as personalized postage indicia. In operation according to embodiments of the invention, a user may select a time the user desires to purchase and activate personalized postage indicia including the personalized content at a distributed printing location. Such information may be used in scheduling resources at the distributed printing locations, to improve user satisfaction, etc. Where a user desires to obtain personalized postage indicia in an expedited manner, embodiments of the invention facilitate priority processing, such as to move submitted personalized content up in the aforementioned screening queue for an additional service fee.

Personalized content which is found to be unacceptable for inclusion in personalized postage indicia may be discarded or returned to a user for removal of the offending content. Alternatively, personalized content which is found to be unacceptable may be filtered to remove the offending content, such as where minimal unacceptable content is present. Embodiments of the invention may operate to interact with a user in the case personalized content is found to be unacceptable in order to facilitate modification, revision, and/or resubmission of personalized content suitable for use in personalized postage indicia.

Figure 4:
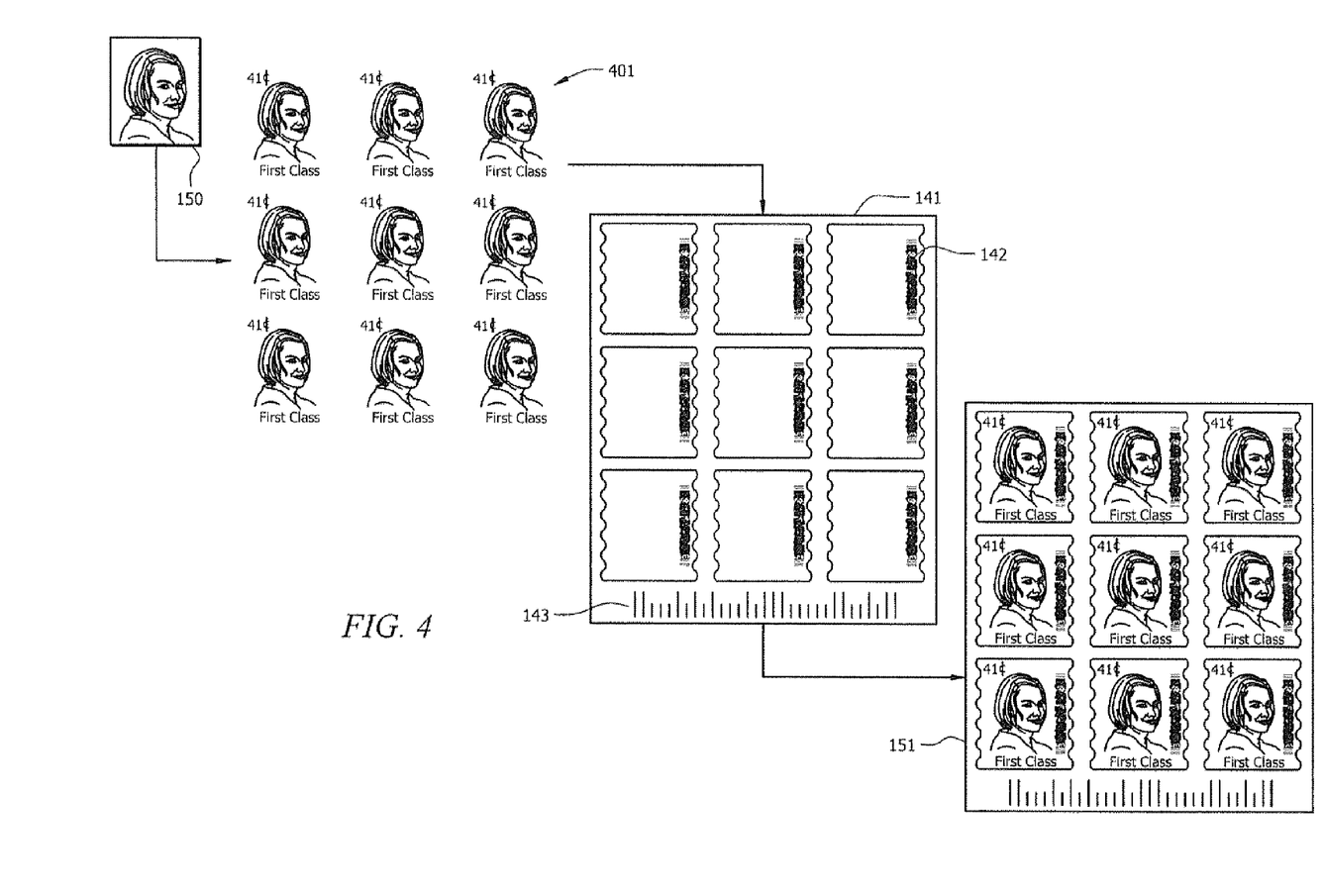
FIGS. 4 and 5 show personalized content assembled in to an appropriate format for printing as personalized postage indicia according to embodiments of the invention.
Figure 5:
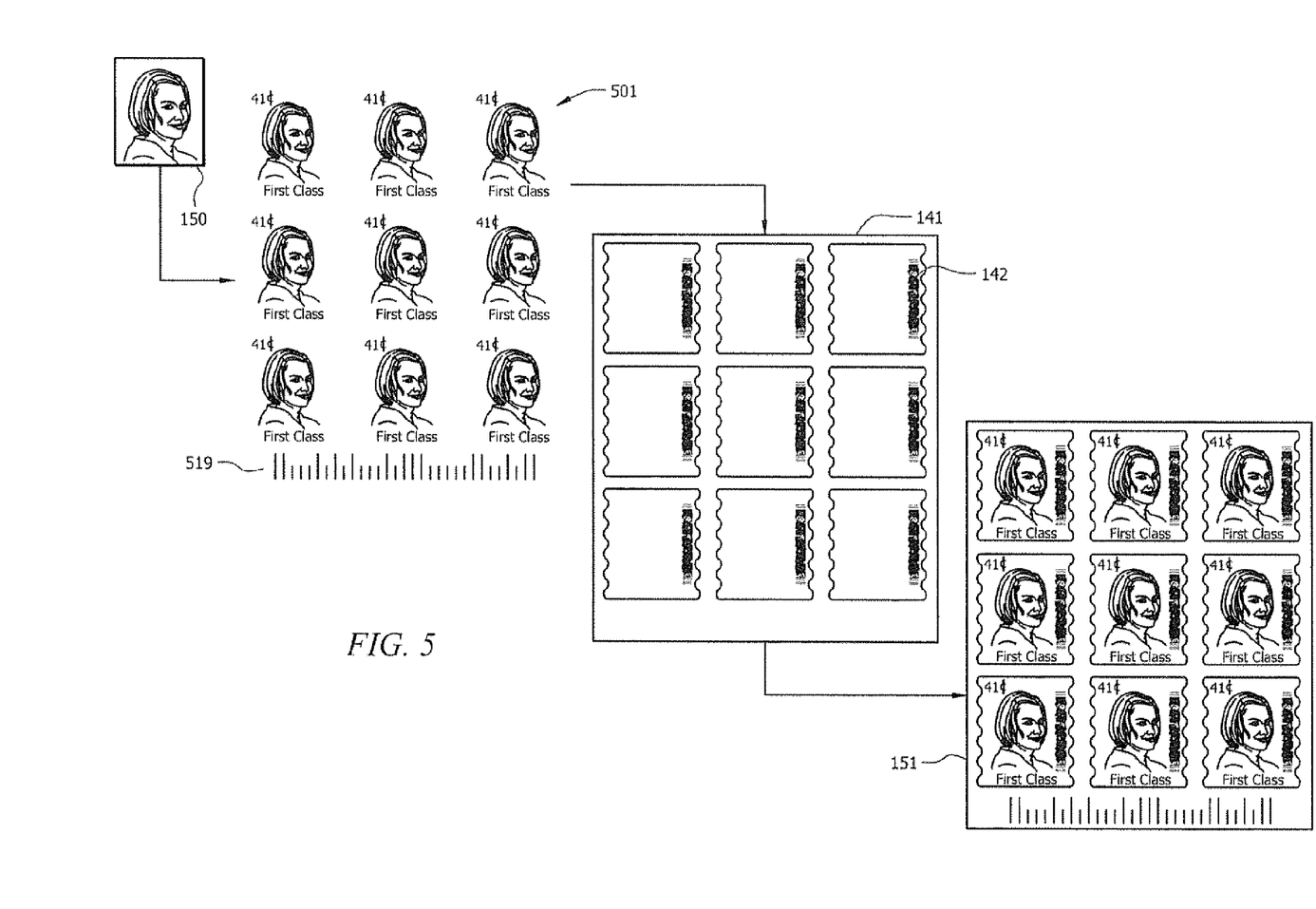

Personalized content which is found to be acceptable, or which is made to be acceptable, is preferably assembled in to an appropriate format for printing as personalized postage indicia at block 205 (such as shown in file 401 of FIG. 4 and file 501 of FIG. 5). For example, the personalized content may be sized, oriented, resolution adjusted, and copied an appropriate number of times to produce the desired number of personalized postage indicia. Additionally or alternatively, information may be added to or removed from the personalized content for use in printing as personalized postage indicia. For example, postage value, postal class, etc. may be added to the personalized content (as shown in file 401 of FIG. 4). Likewise, variable postage amounts can be included in the image file, and may be printed as part of the personalized postage indicia, as requested to facilitate values other than 1 oz 1st Class postage. Embodiments of the invention add identification or control information, such as serial number, transaction identification number, watermark, digital signature, cryptographic string, etc., (as shown by code 519 of FIG. 5) useful in later confirming that personalized content included in personalized postage indicia is approved personalized content. A portion of the personalized content may be deleted or otherwise adapted to accommodate adding information therein, to avoid overprinting other information, such as a token, etc.

Embodiments of the invention provide communication with a user regarding submission of personalized content, approval of personalized content, generation of personalized postage indicia, and/or printing of personalized postage indicia. For example, using the aforementioned contact information provided by a user, embodiments of the present invention provide notification to persons, such as a user that submitted personalized content or a person expected to obtain personalized postage indicia, regarding the personalized content approval process (e.g., the current status of the approval process, an expected time for completion of the process, notification of approval of the personalized content, notification of disapproval of the personalized content, notification that personalized postage indicia has been generated, notification that personalized postage indicia has been printed, etc.). Such communications may be "pushed" to the recipients, such as through automatic communications sent at particular milestones and/or after one or more periods of elapsed time, or may be "pulled" by the recipients, such as through a user requesting status information as desired.

The approved content and/or information added thereto may be stored in database 112 according to embodiments of the invention. For example, approved personalized content and/or control information associated with approved personalized content may be stored in personalized content database 116, such as for later use in verifying personalize content in a personalized postage indicium is approved content, in validating personalized postage indicia, etc.

The approved personalized content, assembled in an appropriate format and/or including appropriate information added thereto, is preferably provided in an electronic file (e.g., file 401 of FIG. 4 or file 501 of FIG. 5) for transmission to a distributed printing location. For example, an image file adapted for printing on postage stock 141 is preferably created using the approved personalized content. That is, a file containing approved personalized content (e.g., approved image(s)), without the foregoing token(s) of a complete postage indicia (e.g., IBI barcode(s)), is provided. Where partial tokens are present on postage stock 141, the aforementioned image file containing approved personalized content may additionally contain corresponding partial tokens for completing the tokens when the personalized content is printed, thereby providing complete personalized postage indicia. Additional content, such as the aforementioned partial tokens used to complete the partial tokens, may be provided separate from personalized content, such as in a separate file, if desired. However, embodiments of the invention include such additional content within the approved personalized content, such as for security and prevention of misuse. For example, approved personalized content or the file transferring approved personalized content is adapted to include control information, such as code 519 of FIG. 5, used to confirm that only approved personalized content is printed on the postage stock for creating personalized postage indicia.

Embodiments of the invention utilizing partial tokens which are included in the foregoing approved personalized content file may operate to provide identification of the postage stock and/or unassigned tokens to activation system 110 prior to creating the file. For example, scanning and communication of postage stock identification information and/or unassigned token information, as described below with respect to block 208, may be performed in combination with the submission of personalized content at block 203 according to embodiments.

At block 206, approved personalized content is provided to the appropriate distributed printing location for printing as complete personalized postage indicia. For example, a file including approved personalized content formatted for printing personalized postage indicia may be provided to the appropriate distributed printing location according to embodiments of the invention. It should be appreciated that security is not really an issue with respect to communication of a file containing the approved personalized content because the file only contains images (and perhaps partial tokens) and does not contain any active or complete postage barcodes or similar indicia. Therefore, if the approved personalized content file is intercepted or stolen the intercepted or stolen information is not valuable. With the lower security requirements around protecting such a file, the approved personalized content file may be transmitted across the public Internet with minimal, if any, security using FTP, HTTP, etc. Additionally, the approved personalized content file may be printed without a local client application at the distributed printing location (e.g., using a pure web browser application or other application). However, security techniques, such as encryption of the approved personalized content file for transmission between activation system 110 and distributed printing system 120, may be implemented if desired.

The distributed printing location to which the approved personalized content file is provided may be the location initially submitting the personalized content for approval or may be a different location. For example, where a user submits personalized content using a personal computer other terminal not affiliated with a distributed printing location, the user may identify a distributed printing location for printing of personalized postage indicia and thus the approved personalized content file may be provided to the identified location.

The aforementioned approved personalized content file is utilized by distributed printing system 120 of the illustrated embodiment in printing the personalized content onto postage stock 141 having tokens 142 thereon at block 207 (as represented in FIGS. 4 and 5). For example, personnel such as a retail sales associate at distributed printing system 120 may cause printer 128 to print an image from the approved personalized content file on postage stock 141, thereby providing complete (albeit not active or "live") personalized postage indicia stock 151 (shown in FIGS. 1 and 4). Because the personalized postage indicia of complete personalized postage indicia stock 151 of the illustrated embodiment remains not active (i.e., tokens 142 remain unassigned or inactivated), if an error occurs during printing (but before tokens 142 are activated) the approved personalized content file can simply be printed again immediately on new postage stock. The misprinted item produced does not need to be saved or returned (perhaps just destroyed) as it is not valid postage.

At block 208, the complete personalized postage indicia are activated for use as valid postage indicia. For example, when the user is satisfied with complete personalized postage indicia stock 151, and thus ready to activate the indicia, scanner 123 may be utilized to scan code 143 included on postage stock 141 (and thus included on complete personalized postage indicia stock 151) and/or one or more of tokens 142 for identification of the token(s) to activate as personalized postage indicia. This information may be provided to activation system 110 for identification of the appropriate unassigned tokens, such as within unassigned tokens database 114, and activation of those tokens and thus the completed personalized postage indicia. Activation of the tokens may comprise moving data associated with particular tokens from unassigned tokens database 114 to assigned tokens database 115 and/or to database 132 of validation system 130.

Activation system 110 preferably operates to change the status of tokens 142 from "unactivated" to "activated." For example, activation system 110 may locate the unique code or other information provided by distributed printing system 120 in database 112 and change status information of tokens associated therewith, such as by changing a status indicator stored in association with the unique code, by moving the unique code from an "unactivated" portion of the database to an "activated" portion of the database, and/or the like. Such a change in status according to embodiments of the invention results in the postage indicia comprising the tokens becoming a valid postage indicia or a value bearing indicia.

As an example of the foregoing operation at block 208, the postage stock, having unassigned token printed thereon, may have been distributed to various distributed printing locations in the form of retail outlets (e.g., pharmacies, department stores, office supply stores, discount retailers, photocopy print shops, etc.) for use in creating personalized postage indicia. The postage stock, preferably after having approved personalized content added thereto (e.g., by a user accessible computer and printer terminal, by an employee operated printing system, by a self-service kiosk, etc.), may be purchased at such retail locations using a substantially traditional payment model (e.g., payment by a purchaser to a retail merchant by cash, check, credit card, debit card, etc.). Equipment of a POS system of the retail outlet may scan the postage stock unique identification (e.g., using a barcode scanner, a MICR reader, an RFID scanner, optical character recognition (OCR) system, etc.) to identify the particular postage stock, and thus the unassigned token, for assigning those tokens as live postage. This identification information, preferably accompanied by additional information (e.g., desired number of postage indicia, postage indicia amount, identification of image(s) included as personalized postage indicia, postage class, account for payment of postage value, etc.) may be provided to an entity for assigning or activating the tokens as live postage and/or other processing, such as a postage service provider which initially produced the unassigned tokens for activation of the tokens. The identification information is used to assign or activate unassigned tokens, and thus the personalized postage indicia generated therewith, to provide live postage indicia acceptable to a postal authority. Information identifying the now assigned tokens may be stored in a database to thereby activate the tokens. Other information may additionally or alternatively be stored in association with activated tokens, such as personalized content, user information (e.g., user identification, payment information, etc.), point of sale or activation information (e.g., retailer identification, activation location, etc.), and/or the like.

Embodiments of activation system 110 preferably operate to facilitate accounting for and/or validating personalized postage indicia. For example, activation system 110 may provide access to, or information from, database 112 to validation system 130 for use in validating personalized postage indicia which have been introduced, into the mail processing stream. The foregoing information may, according to embodiments, include information in addition to information identifying activated tokens. For example, the foregoing user information, such as may include user identification, information regarding a credit card or other account used to purchase the indicia and/or postage value, etc., may be provided to validation system 130 for use in fraud detection, providing an audit trail, etc. Additionally or alternatively, activation system 110 may communicate the fact that the indicia has been activated and/or other information, such as a value of the activated indicia, to distributed printing system 120 and/or validation system 130 for use thereby.

Embodiments of activation system 110 operate to do more than change a status of a database record associated with tokens 142. For example, embodiments of the invention may utilize information provided with the aforementioned unique code, such as postal item weight, postal class, origination location information, destination information, and/or special handling instructions, in order to determine a postal rate, to provide statistical reporting, etc. Moreover, as discussed below, activation system 110 may additionally or alternatively operate to debit an account (or otherwise account for postage value) for the appropriate postal value, such as using the aforementioned determined rate or the desired postage amount transmitted with the unique code or using scale 129 to obtain a weight of one or more mail items and a rating table (available at distributed printing system 120 or another system in communication with distributed printing system 120) for determining an amount of postage. Embodiments of the invention may collect value or fees in addition to a postage amount, such as to collect a surcharge for use of pre-produced indicia as described herein. Additional functions, such as dispatching a courier to retrieve mail items, scheduling postal processing resources, providing reports, etc. may be performed by or in response to activation system 110 activating indicia.

In addition to the foregoing postage stock code and/or token information scanned to provide information for activating personalized postage indicia, embodiments of scanner 123 may operate to scan the personalized content, or information therein or associated therewith (e.g., the aforementioned control information such as may be provided in code 519), to verify that the complete personalized postage indicia includes approved personalized content. This information may be provided to activation system 110 with the aforementioned postage stock code and/or token information. Activation system 110 may compare the personalized content information to that stored in database 112, such as within personalized database 116. If the personalized content cannot be verified as approved, activation of tokens 142, and thus the personalized postage indicia, may be withheld.

Various forms of scanners may be utilized as scanner 123 of embodiments of the invention. For example, traditional optical scanner configurations, such as may comprise flat bed scanners, sheet fed scanners, handheld scanners, camera based scanners, or the like may be used with respect to indicia which is visible in natural light. Where tokens are used which are not visible in natural light or which are configured to be bi-stable, scanners used according to the present invention may be adapted for use therewith, such as by substituting or adding an illumination lamp operable to radiate a desired wavelength of light (e.g., ultraviolet, infrared, etc.). However, lamps used with respect to many commonly available scanners are broad-spectrum enough to cause many ultraviolet and other inks to fluoresce, thereby making it possible in many circumstances to use more traditional optical scanner configurations even with respect to specialized indicia configurations. Scanners implemented according to embodiments of the invention may additionally or alternatively employ technology other than optical scanner technology. For example, radio frequency (RF) scanner technology may be utilized with respect to identification codes and/or tokens borne in RFID tags.

Although embodiments are described above with reference to scanner 123 operating to scan postage stock code 143 and/or tokens 142, it should be appreciated that the use of such a scanner may be omitted according to embodiments of the invention. For example, where postage stock code 143 and/or tokens 142 comprises human readable information providing the aforementioned unique code or other suitable information, whether in combination with machine readable symbology or alone, a user may manually input the information into distributed printing system 120, such as through POS terminal 124.

Activation of personalized postage indicia of embodiments of the invention is provided at a point of sale, such as using POS terminal 124 of the illustrated embodiment. Accordingly, payment for the personalized postage indicia generation and/or the postage value associated therewith may be made at the time of activation. For example, a user may tender an amount to pay for the personalized postage indicia service and for postage value represented by the activated personalized postage indicia. Such payment may be through an account of the user. Alternatively, the user may tender payment to an operator of distributed printing system 120 at the point of sale, and an account of the owner of distributed printing system 120 may be accessed for payment of postage value.

The foregoing payment for postage value may be provided directly from a user, indirectly from a user through an activation service provider (e.g., retailer), indirectly from a user through a postage service provider (e.g., Internet postage provider), directly from an activation service provider, indirectly from an activation service provider through a postage service provider, etc. Such accounting for such postage value payment may be made through incrementing an ascending register and decrementing a descending register, as is typical of a postage meter operation, or through a payment transaction more traditionally used outside of postage metering applications (e.g., without the use of secure ascending and descending registers). For example, prepaid accounts, postpaid accounts, electronic funds transfer, electronic commerce, and/or the like may be used according to embodiments of the invention. However, according to a preferred embodiment, a postage service provider operating activation system 110 will not pay a postal authority, such as the USPS, postage value for a token unless and until that token is included in postage indicia and activated. Detail with respect to accounting for postage value as may be utilized according to embodiments of the invention is shown in the above referenced patent application entitled "Virtual Security Device."

Scanner 123, or other apparatus of distributed printing system 120, may additionally or alternatively operate to provide indication that tokens 142, and thus the personalized postage indicia, have been activated. For example, where one or more bi-stable marks are included in association with tokens 142, scanner device 123 may operate to "develop" the mark (or an appropriate one of a plurality of marks) through exposure to a particular wavelength of light, an appropriate amount of heat, an appropriate frequency of radio frequency energy, an appropriate chemical, a suitable magnetic field, etc., upon activation of the indicium. Detail with respect to developing marks to show activation is provided in the above referenced patent application entitled "Systems and Methods for the Distributed Activation of Postage." The foregoing bi-stable marks need not be utilized to provide the foregoing information or other information on the mail items at the time of activation according to embodiments of the invention. For example, a mark printed by POS terminal 124, or other apparatus of distributed printing system 120, may print symbols or information indicating activation of the postage indicia.

At block 209 personalized postage indicia is utilized to post mail items. For example, a personalized postage indicia may be removed from complete personalized, postage indicia stock 151 and applied to mail item 134, and mail item 134 may be introduced into the mail stream.

Personalized postage indicia, or a statistical sampling thereof, is preferably validated at block 210. Such validation may be performed before mail processing, during mail processing, or after mail processing. For example, mail piece scanner 133 of validation system 130 may obtain information from the personalized postage indicia for use with information stored in database 112 and/or 132 (e.g., comparison of the scanned information to the stored information) in order to validate the indicia. Mail piece scanner 133 may thus comprise traditional optical scanner configurations, such as flat bed scanners, sheet fed scanners, handheld scanners, camera based scanners, or the like when indicia which is visible in natural light are used. As with scanner device 123 discussed above, where tokens are used in the personalized postage indicia which is not visible in natural light, mail piece scanners used according to the present invention may be adapted for use therewith, such as by substituting or adding an illumination lamp operable to radiate a desired wavelength of light (e.g., ultraviolet, infrared, etc.). Likewise, mail piece scanners implemented according to embodiments of the invention may additionally or alternatively employ technology other than optical scanner technology, such as RF scanner technology where RFID tags are used.

According to embodiments of the invention, as a mail item is processed (e.g., at a mail service provider's mail processing station) after the mail item has been introduced into the mail stream, the mail piece is passed through mail piece scanner 133 for scanning tokens 142 to obtain information such as the aforementioned unique code. Likewise, validation system 130 may scan personalized content of the personalized postage indicia to obtain information such as a control code included therein. Validation system 130 may compare this information to information in database 132 and/or database 112 to determine if the personalized postage indicium is a valid postage indicium and/or if the personalized content is approved personalized content. When validated as a mail item is processed, if the indicium is valid (e.g., is activated) and the personalized content is approved personalized content, validation system 130 may allow the mail item to pass for further processing (e.g., processing for delivery to an appropriate destination address). However, if the personalized postage indicium is not valid (e.g., the token therein is unactivated) or the personalized content is not approved personalized content, validation system 130 may prevent further processing (e.g., direct the mail item to a "return to sender" bin) and/or may provide additional processing, as described in further detail below. Various audit processing may also be performed by activation server system 110 and/or validation system 130, such as to detect fraud or abuse of indicia, used for accounting purposes, etc., using the aforementioned indicia information during processing of mail items or thereafter.

Processing of indicia which validation system 130 determines to be unactivated may comprise processing in addition to or in the alternative to rejecting the mail item for delivery. For example, validation system 130, perhaps in cooperation with activation system 110 and/or distributed printing system 120, may operate to decrement an appropriate account (e.g., the appropriate users' account, an account of a service provider providing the pre-produced indicia, etc.) or otherwise issue an invoice or collect for the postal value. Collection of postal value in such a situation may not be limited to the actual postage amount, but may include a surcharge associated with misuse of the indicia. Such additional processing may additionally or alternatively include notifying a user of the detected misuse of indicia, statistical analysis of indicia usage (e.g., to detect fraud or attempted fraud), etc. Likewise, such additional processing may include tracing the particular tokens used as part of the postage indicia to a particular distributed printing location, such as for remedial action.

Embodiments of the invention may operate to perform at least some level of validation at or very near the time a mail item is introduced into the mail stream. For example, a postman initially picking up a mail item for entry into the mail stream may make a determination as to whether the indicia has been activated (e.g., through reference to one or more visible bi-stable mark, through scanning the indicia, etc.) and/or whether the indicia has the appropriate amount of postage value for the mail item (e.g., through reference to a visible indication of postage value, through scanning the indicia, etc.). Accordingly, the postman may be provided with various devices useful according to embodiments of the invention, such as a portable version of mail piece scanner 133.

From the above it can be seen that operation according to the embodiment of FIG. 2 provides personalized postage indicia for mailing documents, wherein the personalized postage indicia is printed at any number of distributed printing locations. Embodiments as described herein facilitate implementations which may readily be deployed at distributed printing locations, such as retail locations. For example, because neither the postage stock nor the personalized content files contain complete or live postage indicia, the loss or theft of either does not result in the loss or theft of postage indicia. Moreover, because the unassigned tokens of the postage stock of embodiments are only activated at a point of sale or other location when the personalized postage has been completed, the risk of loss, theft, or misuse is minimized. Because unassigned tokens have no value, misprints of approved personalized content in an attempt to provide complete personalized postage indicia is a minor inconvenience.

Moreover, embodiments of the present invention facilitate users conveniently creating personalized postage indicia, such as may include personal photographs, messages, images, symbols, etc. Such personalized postage indicia may be printed at a distributed printing location very near the user, perhaps in real-time or near real-time (e.g., service in a time period approximating that of rapid photograph developing services, such as approximately 1 hour) with respect to the user submitting personalized content. Retail locations, such as grocery stores, drug stores, convenience stores, banks, etc. may be utilized to provide distributed printing locations. Moreover, because highly secure client server software is not required according to embodiments of the invention, both user terminals for submitting personalized content and terminals providing for printing of personalized postage indicia may comprise widely available terminal configurations adapted to communicate with an activation system as described herein. For example, a user may submit personalized content using a "camera phone" cell phone according to embodiments of the invention. Personalized postage indicia may be printed using a standard ink jet or laser printer according to embodiments of the invention.

Although embodiments have been described herein with reference to the use of printed tokens, it should be appreciated that other forms of tokens may be utilized according to embodiments of the invention. For example, RFID tags may be applied to or embedded in postage stock for use according to the concepts of the present invention.

It should be appreciated that, although embodiments have been described above with reference to use of personalized indicia in a postage context, the concepts of the present invention may be utilized outside of a postal system. For example, personalized indicia according to embodiments of the present invention may be used with respect to various transactions, such as in business commerce.

Although embodiments have been described herein with reference to printing a plurality of personalized postage indicia, it should be appreciated that embodiments of the present invention may be utilized to generate and print any desired number of personalized postage indicia. For example, a single personalized postage indicia may be generated and printed in an iteration of the flow diagram of FIG. 2, if desired.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   providing postage stock having one or more pre-produced tokens thereon, at least one of said postage stock and said pre-produced tokens having unique identifying information associated therewith;
   receiving personalized content for inclusion in a personalized value bearing indicia;
   approving said personalized content for inclusion in said personalized value bearing indicia;
   printing said approved personalized content on said postage stock in correspondence with said one or more pre-produced tokens to thereby provide at least one complete personalized indicia; and
   activating said one or more pre-produced tokens using said at least a portion of said unique identifying information to assign value to the pre-produced token and provide at least one valid value bearing personalized indicia comprising said one or more pre-produced tokens and said approved personalized content.

2. The method of claim 1, wherein said postage stock having said one or more pre-produced tokens thereon is provided to a distributed printing location remote from a location placing said one or more pre-produced tokens on said postage stock, and wherein said printing to provide said complete personalized indicia is performed at said distributed printing location.

3. The method of claim 2, wherein said distributed printing location comprises a retail location.

4. The method of claim 3, wherein said location combining said postage stock and said one or more pre-produced tokens comprises a postage service provider location.

5. The method of claim 1, wherein said activating said one or more pre-produced tokens comprises:
   receiving at least a portion of said unique identifying information in association with a request for activation of said personalized postage indicia including said pre-produced one or more tokens.

6. The method of claim 5, wherein said activating said one or more pre-produced tokens further comprises:
   debiting an account for the value assigned to said activated value bearing personalized indicia.

7. The method of claim 1, wherein said activating said one or more pre-produced tokens comprises:
   verifying that said approved personalized content is printed on said postage stock in correspondence with said one or more pre-produced tokens.

8. The method of claim 7, wherein said verifying that said approved personalized content is printed on said postage stock comprises:
   obtaining a control code from said complete personalized postage indicia.

9. The method of claim 1, wherein said pre-produced token comprises at least a portion of a barcode symbology.

10. The method of claim 9, wherein said pre-produced token comprises an incomplete portion of said barcode symbology, and wherein said printing approved personalized content on said postage stock in correspondence with said one or more pre-produced tokens comprises printing a completing portion of said barcode symbology.

11. The method of claim 1, wherein said unique identifying information comprises a unique code identifying said postage stock.

12. The method of claim 1, wherein said unique identifying information comprises a unique code identifying said one or more pre-produced tokens.

13. The method of claim 1, wherein said activated value bearing personalized indicia comprise postage indicia.

14. The method of claim 1, further comprising:
   posting a mail item bearing one of said activated at least one value bearing personalized indicia;
   scanning said one of said at least one activated value bearing personalized indicia to obtain said at least a portion of said identifying information; and
   validating said one of said at least one activated value bearing personalized indicia has been activated using said at least a portion of said unique identifying information.

15. A method comprising:
   obtaining postage stock having at least one pre-produced token thereon, at least one of said postage stock and said pre-produced token having unique identifying information associated therewith;
   submitting personalized content for approval for inclusion in a personalized value bearing indicia;
   selecting a piece of said postage stock for use in creating said personalized value bearing indicia using said personalized content;
   printing said approved personalized content on said selected postage stock in correspondence with said at least one pre-produced token to thereby provide a complete personalized indicium;
   providing at least a portion of said unique identifying information in a request for assigning value to said complete personalized indicium including said pre-produced token to activate said complete personalized indicium as a personalized value bearing indicium; and
   obtaining payment for the value of activated said personalized value bearing indicium.

16. The method of claim 15, wherein said pre-produced token comprises at least one of a barcode symbology and a radio frequency identification tag.

17. The method of claim 15, wherein said personalized value bearing indicium comprises a postage indicium.

18. The method of claim 15, further comprising:
   providing an indication that said complete personalized indicium has been activated as said personalized value bearing indicium.

19. The method of claim 15, wherein said postage stock having said at least one pre-produced token thereon is provided to a distributed printing location remote from a location combining said postage stock and said at least one pre-produced token, and wherein said printing to provide said complete personalized indicia is performed at said distributed printing location.

20. The method of claim 15, further comprising:
   verifying that said approved personalized content is printed on said postage stock in correspondence with said at least one pre-produced tokens.

21. A system comprising:
a plurality of postage stock pieces, wherein each postage stock piece of said plurality has a pre-produced token associated therewith, said pre-produced token comprising an information based indicia (IBI) barcode adapted for subsequent activation as part of a personalized value bearing indicium;
a user terminal for inputting personalized content for inclusion in said personalized value bearing indicium, said personalized content comprising at least one of a photo or an image selected by a user for personalizing said personalized value bearing indicium;
a first scanner device for scanning unique information identifying at least one of a selected postage stock piece of said plurality of postage stock pieces and a pre-produced token associated with said selected postage stock piece;
an activation system for approving said personalized content for inclusion in said personalized value bearing indicium and for activating said pre-produced token of said selected stock piece to thereby represent value using at least a portion of said unique information obtained using said first scanner; and
a printer for printing said authorized personalized content on said selected stock in association with said pre-produced token to thereby provide a complete personalized indicium, said complete personalized indicium becoming said personalized value bearing indicium only upon said activation system activating said pre-produced token of said selected stock piece.

22. The system of claim 21, further comprising:
a second scanner device for scanning said personalized value bearing indicium; and
a validation system for validating said personalized value bearing indicium after said personalized value bearing indicium has been introduced into a transaction stream using at least a portion of information obtained from said personalized value bearing indicium by said second scanner.

23. The system of claim 21, wherein said postage stock pieces comprise stock selected from the group consisting of label stock, envelope stock, paper stock, and card stock, wherein said personalized value bearing indicium comprises postage indicium, and said transaction stream comprises a mail processing stream.

24. The system of claim 21, wherein said first scanner comprises a point of sale scanner.

* * * * *